Nov. 25, 1952     O. J. POUPITCH     2,618,998
MOLDING CLIP
Filed Nov. 3, 1949     2 SHEETS—SHEET 1
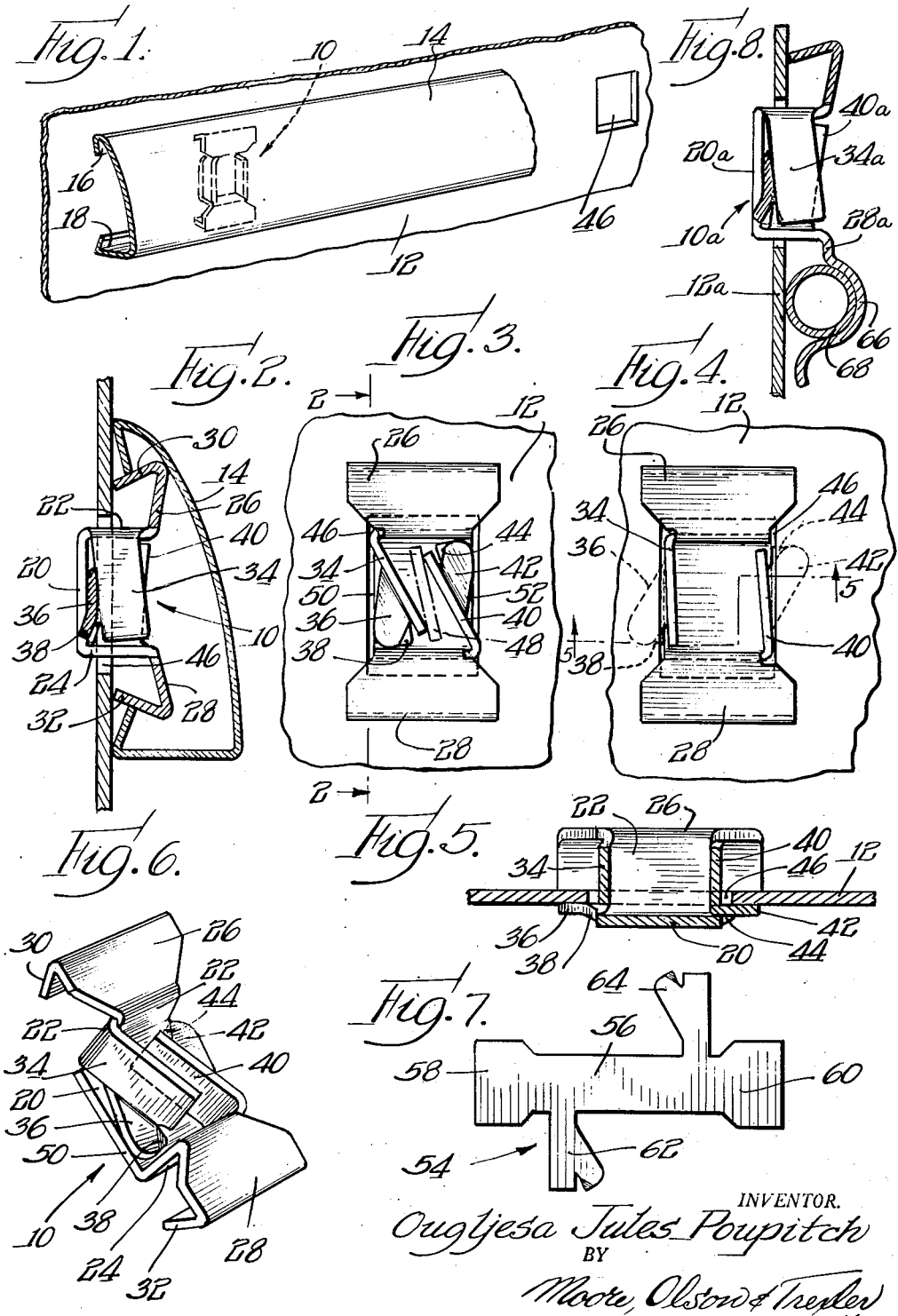
INVENTOR.
Ougljesa Jules Poupitch
BY
Moore, Olson & Trexler
attys.

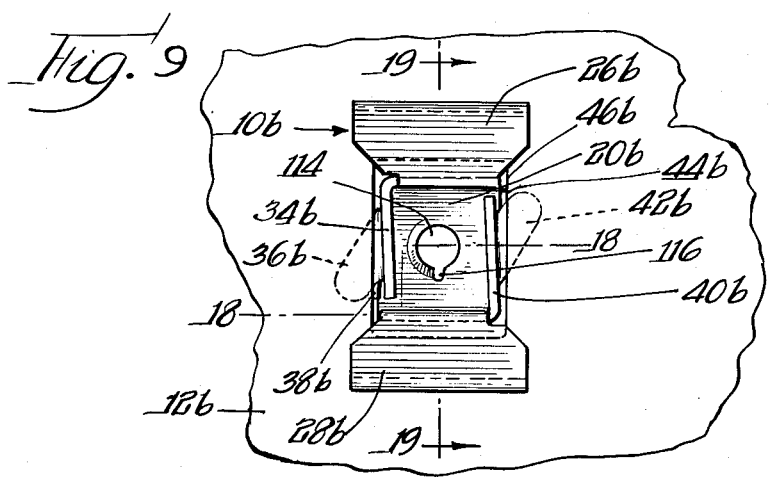
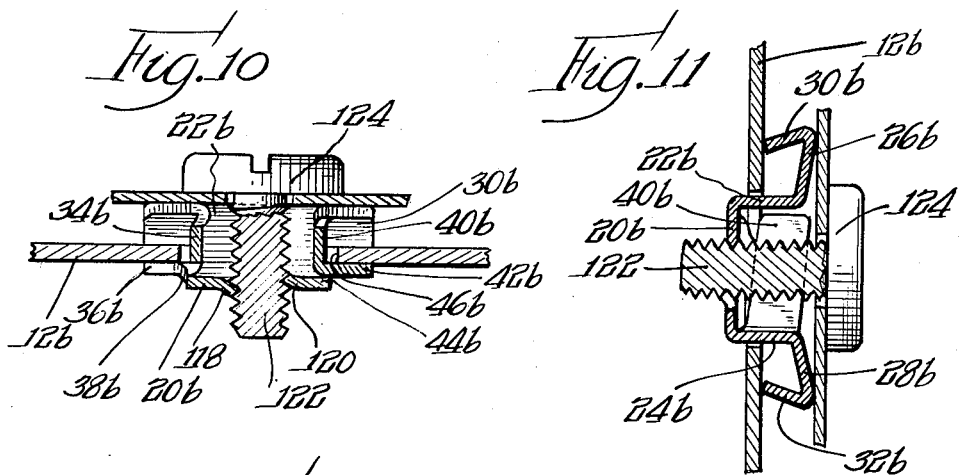
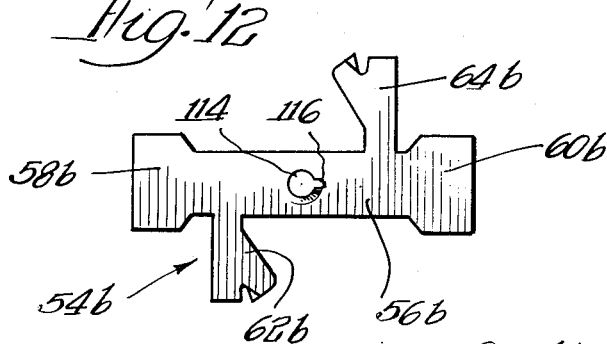

Patented Nov. 25, 1952

2,618,998

UNITED STATES PATENT OFFICE 2,618,998

MOLDING CLIP

Ougljesa Jules Poupitch, Chicago, Ill., assignor to Illinois Tool Works, Chicago, Ill., a corporation of Illinois Application November 3, 1949, Serial No. 125,328

5 Claims. (Cl. 85—37)

This invention relates generally to a fastening or mounting device and more particularly to sheet metal blind fasteners having a deflectable stud adapted to be moved into engaging position with a work piece by applying a relatively slight rotative force by means of a common tool such as a screw driver.

Various forms of blind fasteners and mounting devices have been provided for securing objects to work pieces and panels by assembling operations performed wholly on one side of the work piece or panel. Certain of these prior devices are of the multi-part type which comprise one or more parts forming a socket which is first attached to a work piece and one or more parts forming an object securing member which is afterwards attached to the socket and interlocked therewith. A second general type of such devices comprises a snap fastener member which is snapped into the aperture in a work piece and to which is attached an object supporting or securing member which is secured to a second work piece by the snap fastener member.

The multi-part type of fastener and the snap fastener type are unsatisfactory for applications where positive interlocking of the work piece and the secured member is required. The need for close tolerances and the fitting for the sockets in the work pieces and the stud part in the sockets make the production of these members so costly that these types of fasteners are commercially unsatisfactory, particularly for use in the mass production industries. Certain types of fasteners require the application of relatively heavy force or blows in an axial direction to secure them in position and are generally unsatisfactory in those applications in which the supporting work piece is made of relatively light or thin gauge material which will not withstand the force or pressure of the blow necessary to affix the stud portion of the fastener to the work piece.

The present invention is therefore concerned primarily with the provision of a simple, preferably one-piece fastener, mounting device, or clip which overcomes or avoids such defects and disadvantages of the prior art devices previously mentioned. More specifically the present invention contemplates a fastener of the type having an object supporting portion and a stud member preferably formed integral with said portion, which stud member is adapted for engagement with a supporting work piece by the application of a relatively light rotative force using a common tool such as a screw driver.

More particularly the present invention contemplates a fastener of the type referred to above which may be stamped from a sheet or strip of material such as sheet metal and which comprises an article supporting portion to which is integrally attached a stud member adapted to be inserted through a work aperture and then moved into engagement with the material surrounding the work aperture and to enter into locking engagement with the supporting work piece, thereby positively to interlock the article supporting portion with the work piece.

Therefore, it is an object of the invention to provide an improved one-piece blind fastening device having a stud portion insertable through a work aperture from one side thereof and adapted to be attached to a work piece by applying moderate pressure to the stud to deflect the stud laterally after insertion into the work aperture to engage and positively interlock with the opposite side of the work aperture.

More particularly it is an object of the invention to provide a fastener of the type described in which the work piece engaging stud is deflected into fastening position by the application of a relatively slight rotative force applied normally to the plane of the work piece.

Another object of the invention is to provide a molding clip or fastener of the type described in which the stud or finger member is positively locked in the attached position after the stud has been deflected or deformed.

The foregoing and other objects and advantages will be more apparent from the following detailed description when considered in connection with the accompanying drawings wherein:

Figure 1 is a fragmentary perspective view showing a fastener attached to a supporting work piece by a fastening member or clip embodying the features of the present invention;

Figure 2 is an enlarged partial cross-sectional view of the assembly shown in Figure 3 as seen in the direction of the arrows along the line 2—2 thereof;

Figure 3 is a plan view of the fastener member shown in Figures 1 and 2 applied to a supporting work piece before the retaining studs have been urged to the attaching position;

Figure 4 is a view similar to Figure 3 showing the retaining studs deflected into engaging position;

Figure 5 is a cross sectional view of the assembly shown in Figure 4 as seen in the direction of the arrows along the line 5—5 thereof;

Figure 6 is an enlarged perspective view of the fastener member shown in Figures 1–5;

Figure 7 is a plan view of the one-piece stamped sheet metal blank from which the fastener of Figures 1–6 is formed;

Figure 8 is a cross sectional view similar to Figure 2 showing a modification of the fastener whereby the retaining arms are formed to hold a tube or wire in position on a supporting work piece;

Figure 9 is a plan view of another form of fastener made in accordance with and embodying the principles of the present invention showing the fastener in position upon a work piece;

Figure 10 is a side view in cross section of the fastener shown in Figure 9 substantially as seen in the direction of the arrows along the line 18—18 thereof;

Figure 11 is another cross sectional view of the fastener shown in Figure 9 substantially as seen in the direction of the arrows along the line 19—19 thereof; and Figure 12 is a plan view of the blank from which the fastener in Figures 9–11 is formed.

Referring now to the drawings wherein like numerals have been employed to designate similar parts throughout the various figures, it will be seen that one embodiment of the fastening device contemplated by the present invention is generally designated by the numeral 10 in Figures 1–6 inclusive. In Figure 1, one of the clips 10 is shown applied to a supporting work piece or panel 12, and a molding strip 14 having inturned flanges 16 and 18 is shown applied to the fastener 10.

The fastener 10 includes a generally rectangularly shaped body portion 20 on which is formed at each end thereof sections 22 and 24 which are disposed at substantially right angles with respect to the plane of body portion 20. Formed integral with and on the ends of sections 22 and 24 are the molding strip engaging members 26 and 28. As can be best seen in Figure 2 the molding strip engaging members 26 and 28 are oppositely disposed to each other and extend laterally outwardly from sections 22 and 24. The outermost ends 30 and 32 are bent sharply towards the body portion 20 and form an angle of less than 90 degrees with respect to the main portion of the engaging members 26 and 28. Molding strips 14 of the type illustrated are readily snapped into position on the molding strip engaging members 26 and 28 of clip 10.

Formed on one of the edges of section 22 which is perpendicular to the plane of body member 20 is a laterally extending latching arm 34. Arm 34 is generally rectangular in shape and shorter than the side of body member 20 that lies between the sections 22 and 24. Arm 34 is joined to section 22 by a bendable connection so that the arm may be readily moved or shifted with respect to the rest of clip 10. A stud 36 is integrally attached to the edge of latching arm 34 which is adjacent the body member 20. Stud 36 has a locking portion or shoulder 38 formed on the side thereof adjacent the end of latching arm 34, which locking shoulder is formed in the stamping operation from a corner of the latching arm 34 and is bent downwardly out of the plane of body portion 20. The purpose of the locking shoulder 38 will be explained hereinafter.

A second latching arm 40 with an accompanying stud 42 and a locking shoulder 44 is formed on and bendably joined to the edge of section 24 which is positioned diagonally across the body 20 from the point at which latch arm 34 is connected to section 22. The construction of latching arm 40 and its associated parts, the stud 42 and the shoulder 44, is identical with the construction of parts 34, 36 and 38 respectively.

Fastener 10 is applied to a supporting work piece such as panel 12 by first forming in work piece 12 an aperture 46 which is of a shape and size to receive the body portion 20 of fastener 10. In the form of the invention illustrated in Figures 1–6, this aperture is generally rectangular in shape. The formed molding clip is then placed in position upon the work piece 12 by inserting the body portion 20 and associated parts into the aperture 46. As illustrated in Figure 2, the free ends of sections 30 and 32 limit the distance which body portion 20 will extend through aperture 46. It is essential that this portion of the fastener 10 extend through the aperture in the work piece far enough that the studs 36 and 42 are positioned on the opposite side of the work piece. Figure 3 shows a fastener 10 inserted into an aperture in a work piece 12 as described above. At this point in the assembly the blade 48 of a screw driver or similar tool is inserted between the latching arms 40 and 42. By rotating blade 48 in a clockwise direction as seen in Figure 3, the latching arms 34 and 40 will be urged outwardly away from each other and from the center of body portion 20. The application of the force necessary to deflect latching arms 34 and 40 is made possible by the action of the edges of sections 22 and 24 against the sides of the rectangular aperture 46.

As the latching arms 34 and 40 are deflected outwardly away from each other, the studs 36 and 42 will be moved behind the work piece 12, that is, they will be moved into a position on the side of the work piece opposed to that from which the fastener 10 is applied. When the latching arms 34 and 40 are in the position shown in Figures 3 and 6, the stud portions 36 and 42 are resiliently urged toward the body portion 20. Upon movement of the latching arms 34 and 40 to the position shown in Figure 4, the locking shoulders 38 and 44 are resiliently snapped past the plane of body portion 20 whereby to engage the edges 50 and 52 of body portion 20 to lockingly engage therewith. This locking action of shoulders 38 and 44 prevents inadvertent retraction of fingers 30 and 42 and hence unauthorized loosening or removal of the fastener 10.

Molding clip 10 is made by first stamping a blank 54 such as the one illustrated in Figure 7 from a strip of sheet stock such as metal. This blank 54 is then shaped in a series of progressive dies to form molding clip 10. The generally rectangularly shaped central portion 56 of blank 54 is formed into the central body portion 20 and the upstanding sections 22 and 24. The ends 58 and 60 are formed into the molding strip retaining members 26 and 28 and the laterally extending projections 62 and 64 form the latching arms 34 and 40 and associated parts. The molding clip illustrated in Figures 1–7 is economical and relatively simple in manufacture.

Figure 8 shows a modification of the fastener illustrated in Figures 1–7. This modification generally designated by the numeral 10a comprises a central body portion 20a and latching arms 34a and 40a and associated parts which are of the same construction as the corresponding components of fastener 10. The only change in structure is a modification of the molding strip retaining member 28 of fastener 10 which, in the modification shown in Figure 8, is formed with an arcuate section 66 adapted to receive and hold a conduit 68 or similar object. Fastener 10a is applied to the supporting work piece 12a in the same manner as that described for the application of fastener 10 to work piece 12. Fastener 10a will positively hold the conduit 68 in position upon the work piece 12a. Other modifications in the members 26 and 28 can be made to accommodate other types and shapes of objects which it may be desirable to attach to a work piece such as panel 12a.

Figures 9-12 show yet another form of the present invention which is similar in structure to the embodiment illustrated in Figures 1-7. This form of the invention is particularly adapted to receive a thread engaging member after the fastener is placed in position upon a work piece. The thread engaging member which is preferably in the form of a bolt secures a second work piece to the first work piece. Like numerals have been utilized to indicate parts having substantially the same construction. The fastener, generally designated by the numeral 10b, includes a rectangularly shaped body portion 20b on which are formed at each end thereof perpendicularly disposed sections 22b and 24b. There are formed on the ends of sections 22b and 24b a pair of laterally extending work piece engaging members 26b and 28b whose outer ends are reversely bent towards the body portion 20b as at 30b and 32b. The length of sections 22b—24b and 30b—32b is generally relatively shorter than the length of the corresponding parts of the fasteners shown in Figures 1-7.

The fastener 10b is provided with a pair of diagonally disposed latching arms 34b and 40b that are fastened to the peripendicularly disposed sections 22b and 24b. Disposed on the laterally extending edges of arms 34b and 40b that are nearest the body portion 20b are a pair of stud members 36b and 42b. The studs 36b and 42b are provided with locking portions 38b and 44b for the reasons set forth above with respect to the fastener of Figures 1-7.

The general arrangement of the parts and the operation thereof of the fastener shown in Figures 9-11 is substantially the same as that of the fastener shown in Figures 1-7. In the embodiment shown in Figures 9-12, the body portion 20b has a circular aperture 114 formed substantially in the center thereof. A slot 116 is formed on one side of aperture 114 and connecting therewith. A helical impression is formed in the material surrounding the aperture 114 by deforming the material to the left as seen in Figure 10 at 118 downwardly and the material to the right as at 120 upwardly. As is well known in the art such a helical impression is adapted to receive a threaded shank such as the shank 122 of the screw 124. The screw 124 in turn is capable of holding other work pieces in assembled relationship to the work panel 12b.

There is illustrated in Figure 12 a blank from which the fastener is formed. By referring to Figure 7 it will be seen that the blank is substantially the same as that shown in Figure 7 with the addition of the apertures 114—116 and the helical impression which is formed from the material surrounding these apertures. The fastener is formed by folding the blank as has been described above with respect to the fastener of Figures 1-7.

As has been pointed out above the portions of the fastener 10b that are disposed substantially perpendicularly to the work panel 12b have in general a substantially smaller height than the corresponding parts of the fastener shown in Figures 1-7. This embodiment of the invention illustrates the various forms of fastener receiving means which can be employed with fasteners of this type.

From the foregoing it will be apparent that there has been provided a simple, preferably one-piece fastener or clip which fulfills all of the above objects and avoids the defects or inadequacies of prior devices. More particularly there has been provided a fastener or molding device which may be applied by a relatively slight rotative force using a common tool such as a screw driver. The fastener will be positively held in position upon the supporting work piece in such a manner that inadvertent or unauthorized withdrawal of the fastener will not be possible. There has been provided a fastener which may be formed by standard stamping or other forming operations from a sheet or strip such as sheet metal.

While for purposes of disclosure certain structural embodiments have been described herein, it will be understood that other modifications and changes are contemplated without departing from the spirit and scope of the appended claims.

The invention is hereby claimed as follows:

1. A one piece sheet metal blind fastener comprising a U-shaped stud portion having opposed axially extending side walls interconnected by a transverse section at the entering end, head means at the opposite end of each side wall extending laterally outwardly therefrom and adapted to engage the surface of a complementary apertured work piece, and latching means extending from axially disposed margins of said side walls, said latching means including laterally shiftable arms hingedly connected with said axial margins of the side walls with the free extremities laterally shiftable with respect to the stud axis, and a finger carried by each of said arms extending substantially parallel to the plane of said transverse section, said arms and fingers normally positioned within predetermined peripheral confines to permit free insertion of the stud portion within a complementary work aperture with said fingers adjacently superimposing said transverse section, said arms defining an area therebetween for accommodating an arm shifting tool and adapted after insertion of the stud within a work aperture to be moved by such a tool transversely with respect to the stud axis so as to position said fingers beyond the peripheral confines of the stud in underlying disposition relative to the surface of a complementary work piece opposite to the surface engageable by said head means with a portion at least of said latching means superimposing said transverse section.

2. A one piece sheet metal blind fastener as set forth in claim 1, wherein the latching means includes an abutment operable as an incident to the outward shifting of said arms for interlocking with the transverse section of the stud portion to secure said arms in said outwardly shifted position.

3. A one piece sheet metal blind fastener as set forth in claim 1, wherein the head means includes oppositely disposed shoulders for accommodating opposed inturned flanges of a channeled work piece.

4. A one piece sheet metal blind fastener as set forth in claim 1, wherein the transverse section of the stud portion is apertured to provide a locking section for engaging the periphery of an elongated fastener shank.

5. A one piece sheet metal blind fastener as set forth in claim 1, wherein the side walls of the stud portion and the outer surfaces of the arms in transverse cross section present a periphery of polygonal shape when the fastener is finally mounted within a work piece whereby to secure the fastener and work piece against relative rotation.

OUGLJESA JULES POUPITCH.

REFERENCES CITED

The following references are of record in the file of this patent:

UNITED STATES PATENTS

| Number | Name | Date |
|---|---|---|
| 1,542,727 | Regan | June 16, 1925 |
| 1,737,375 | King | Nov. 26, 1929 |
| 2,208,878 | Wiley | July 23, 1940 |
| 2,303,148 | Tinnerman | Nov. 24, 1942 |
| 2,319,678 | Hall | May 18, 1943 |
| 2,513,105 | Poupitch | June 27, 1950 |